United States Patent [19]
Holroyd

[11] Patent Number: 4,819,994
[45] Date of Patent: Apr. 11, 1989

[54] ANTI LOCK BRAKING SYSTEM FOR VEHICLE

[75] Inventor: Trevor J. Holroyd, Mickleover, United Kingdom

[73] Assignee: Rolls-Royce, London, United Kingdom

[21] Appl. No.: 121,870

[22] Filed: Nov. 17, 1987

Related U.S. Application Data

[63] Continuation-in-part of Ser. No. 6,065, Jan. 22, 1987, abandoned.

[30] Foreign Application Priority Data

Apr. 17, 1986 [GB] United Kingdom ............... 8609378

[51] Int. Cl.$^4$ .............................................. B60T 8/58
[52] U.S. Cl. ............................. 303/100; 303/DIG. 4
[58] Field of Search ............... 303/20, 100, 101, 102, 303/103, 104, 105, DIG. 4; 73/584, 587

[56] References Cited

U.S. PATENT DOCUMENTS

| | | | |
|---|---|---|---|
| 3,124,220 | 3/1964 | Kell | 303/100 X |
| 3,630,578 | 12/1971 | Kaiser | 303/100 |
| 3,998,496 | 12/1976 | Bernabo et al. | 303/106 |
| 4,289,358 | 9/1981 | Dufft et al. | 303/100 X |
| 4,743,074 | 5/1988 | Inoue | 303/100 |

FOREIGN PATENT DOCUMENTS

0966209 4/1975 Canada .............................. 303/103
1270364 4/1972 United Kingdom .

Primary Examiner—Andres Kashnikow
Assistant Examiner—Timothy Newholm
Attorney, Agent, or Firm—Cushman, Darby & Cushman

[57] ABSTRACT

An anti lock braking system for a vehicle includes transducers acoustically coupled to a non-rotating member of the wheel assembly and adapted to provide an electrical output signal dependent upon the degree of acoustic emission activity in the non-rotating member. A detector is adpated to analyze when the electrical output signal which corresponds to the acoustic emission activity in the non-rotating member falls to zero when brake pads are in frictional contact with the confronting surface of the wheel. The detector is adpted to send a feedback signal to a control device which controls the pressure applied to the wheel by the brake pads. Preferably the detector measures the instantaneous change of electrical output signal as a funtcion of the pressure applied by the brake pad. If the slope of the function is positive, the brake pressure is allowed to increase, if the slope is negative, the brake pressure is reduced and if the slope is zero the brake pressure is maintained so that maximum braking efficiency is obtained.

12 Claims, 8 Drawing Sheets

ANTI LOCK BRAKING SYSTEM FOR VEHICLE

This is a continuation-in-part of application Ser. No. 006,065, filed Jan. 22, 1987, which was abandoned upon the filing hereof.

The present invention relates to braking systems for vehicles, particularly for an anti-lock braking system which may be used to prevent the wheels of a motor vehicle, train or other suitable vehicle, locking when a braking force is applied.

The braking system of a motor vehicle comprises brake pads which in operation are moved into fictional contact with either a respective wheel drum or wheel disc. The frictional contact between the brake pads and wheel drum or wheel disc is used to dissipate the kinetic energy of the wheels and vehicle, as is well known.

One of the problems of braking systems, which is well known, is that under heavy braking it is likely that the frictional contact between the brake pads and wheel drum, or disc, is sufficient to cause the wheel to lock. Also under heavy braking it is usual for the wheel to skid prior to locking. Both of these events are undesirable as they reduce the controllability of the vehicle under braking conditions.

Conventional anti-lock braking systems require a means of detecting when the wheel is locking, so that the brake can be released, and also a way of determining when the wheel has stopped skidding after the brake has been released, so that the brake can be reapplied.

In a conventional anti-lock braking system the speed of rotation of each individual wheel must be monitored to recognize unrealistic rates of rotational speed reduction. This may be achieved using a measurement of the deceleration of the vehicle as measured by an accelerometer.

The present invention seeks to produce a novel antilock braking system for a vehicle in order to allow greater control of a vehicle under braking conditions, Accordingly the present invention provides an anti-lock braking system for a vehicle comprising a transducer acoustically coupled to at least one brake pad which is arranged to move into frictional contact with a confronting surface on a wheel, the transducer being adapted to provide an electrical output signal dependent upon the degree of acoustic emission activity detector means adapted to analyze the electrical output signal which corresponds to the level of acoustic emission activity in the non rotating member, the detector means being adapted to send a feedback signal to a control means which controls the pressure applied to the wheel by the at least one brake pad so as to at least reduce the pressure applied to the wheel.

The detector means may be adpated to detect when the electrical output signal which corresponds to the level of acoustic emission activity falls to substantially zero when the at least one brake pad is in frictional contact with the confronting surface of the wheel, the detector means being adapted to send a feedback signal to the control means which momentarily releases the force exerted by the at least one brake pad on the confronting surface of the wheel to prevent locking of the wheel.

The detector means may be adapted to detect when the rate of reduction of the electrical output signal is greater than a predetermined rate of reduction when the at least one brake pad is in frictional contact with the confronting surface of the wheel, the detector means being adapted to send a feedback signal to the control means which momentarily releases the force exerted by the at least one brake pad on the confronting surface of the wheel to prevent skidding of the wheel.

The detector means may measure the instantaneous rate of change of the electrical output signal as a function of the pressure applied to the wheel by the at least one brake pad the detector means being adapted to send a feedback signal to the control means which allows the pressure applied to the wheel to be increased by a predetermined amount when the said change of the electrical output signal as a funtion of pressure applied to the wheel is positive, reduces the pressure applied to the wheel by a predetermined amount when the said change of the electrical output signal as a function of pressure applied to the wheel is negative or maintains the pressure applied to the wheel when the said change of the electrical output signal as a function of pressure applied to the wheel is substantially zero so that the pressure applied to the wheel by the at least one brake pad corresponds substantially to that required for maximum braking efficiency.

The pressure applied to the wheel by the at least one brake pad may be modulated, the instantaneous change of the electrical output signal as a function of the pressure applied to the wheel by the at least one brake pad is measured over one period of modulation.

A brake pedal may be provided which is connected to and is arranged to move a first piston axially in a first chamber defined by a first cylinder, the first chamber being arranged to supply hydraulic fluid via piping to at least one second chmber defined by a second cylinder, the second chamber having at least one second piston arranged to move axially of the second cylinder, the at least one second piston abutting and being arranged to move the at least one brake pad into frictional contact with the confronting surface of the wheel when the brake pedal moves the first piston into the first chamber.

The pressure applied to the wheel is modulated by modulation of the pressure of the hydraulic fluid.

The first cylinder may produce periodic changes in pressure.

The brake pad may be a brake shoe, and the confronting surface of the wheel is an inner surface of a wheel drum.

The confronting surface of the wheel may be a surface of a wheel disc.

The transducer may be acoustically coupled to the brake shoe, the second cylinder, a back plate, or other non rotating member.

The present invention will be more fully described by way of reference to the accompanying drawings in which.

Figure 6A:
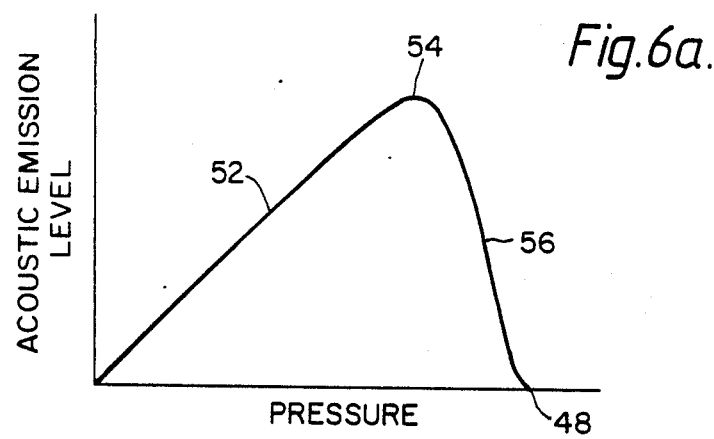
Figure 6B:
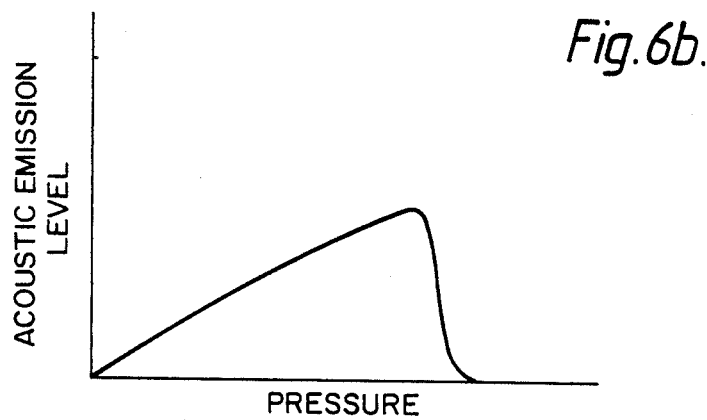
Figure 6C:
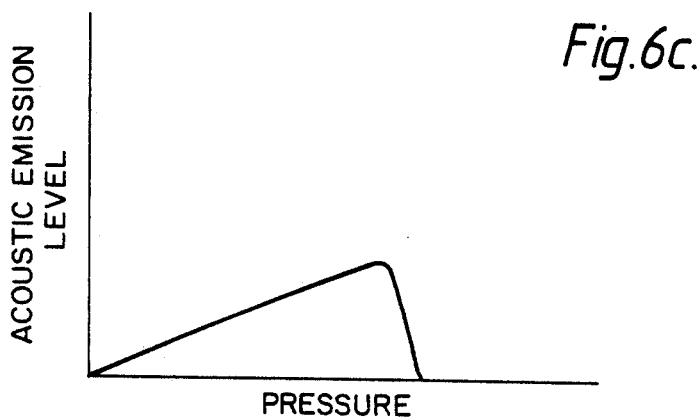

FIGS. 6a, 6b, and 6c show hypothetical plots of acoustic emission level against pressure applied by the brake system at constant speed with the figures respectively showing plots for high, intermediate and low constant speeds.

Figure 7A:
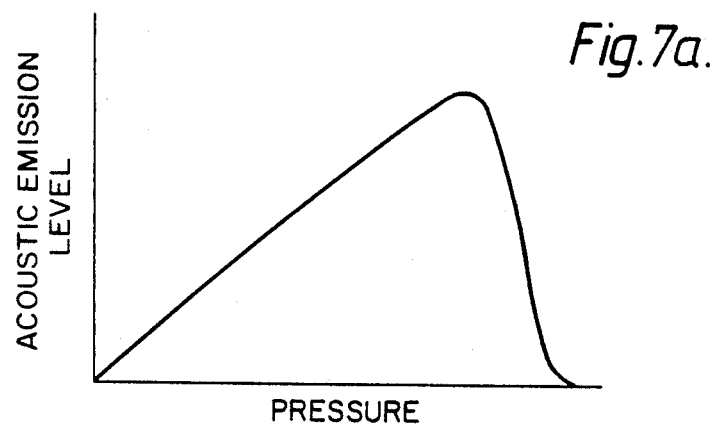
Figure 7B:
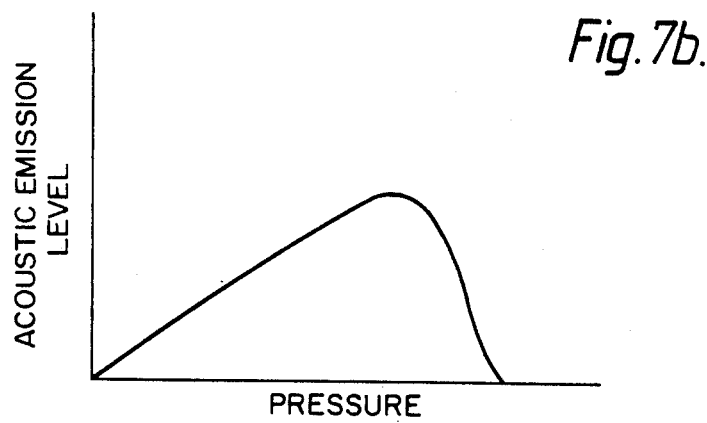
Figure 7C:
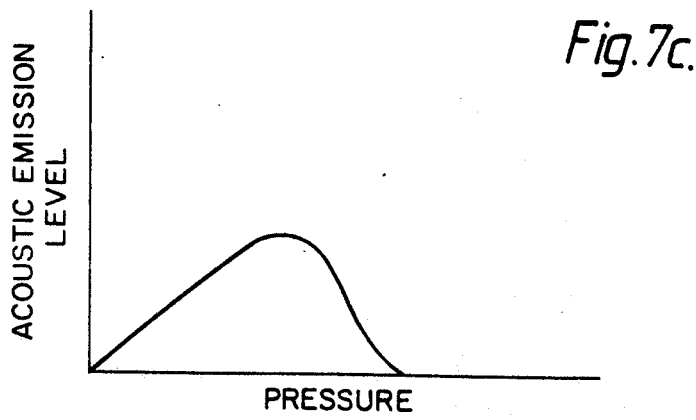

FIGS. 7a, 7b, and 7c show plots of acoustic emission level against pressure applied by the brake system for various conditions of surface upon which the wheels run, the figures showing respectively plots for good, intermediate and bad traction.

Figure 8A:
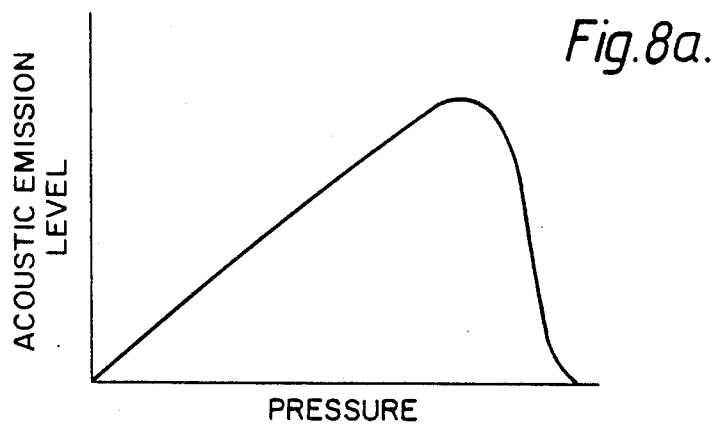
Figure 8B:
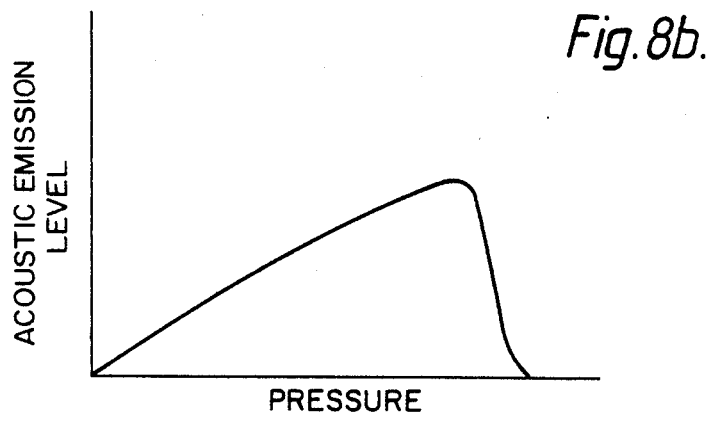
Figure 8C:
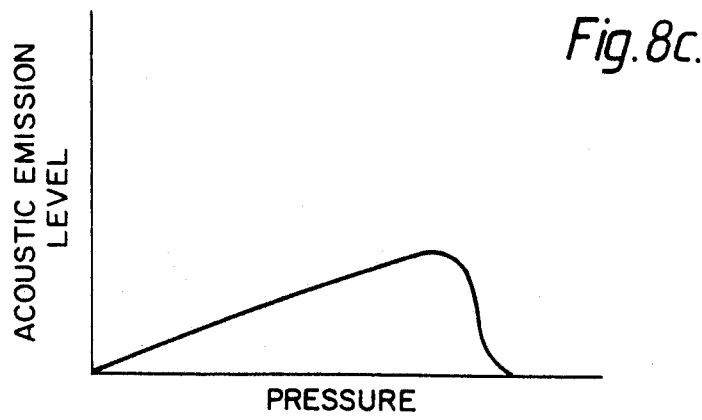

FIGS. 8a, 8b and 8c show plots of acoustic emission level against pressure applied by the brake system for various sensitivities of the transducer, the graphs showing respectively plots for good, intermediate and poor sensitivity.

Figure 9:
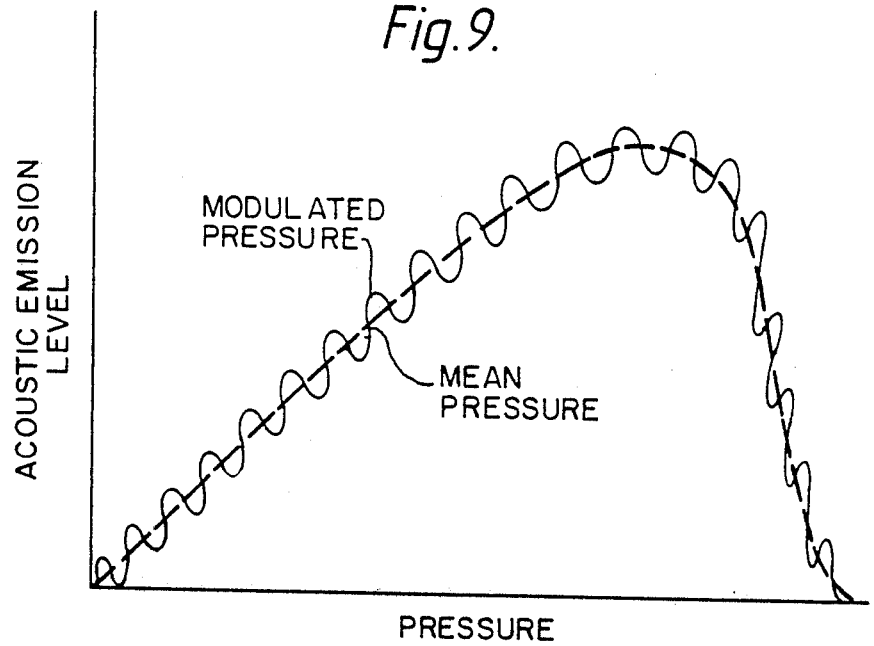

FIG. 9 shows a plot of acoustic emission level against pressure applied by the brake system with pressure modulation.

Figure 10:
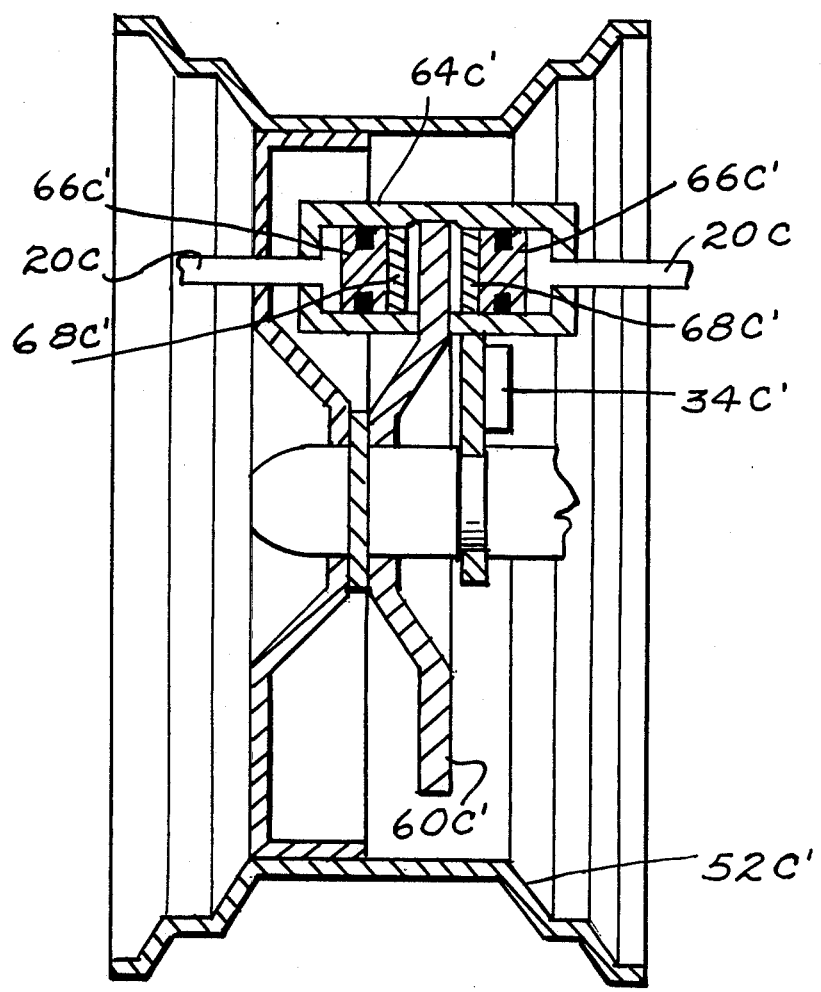
Figure 11:
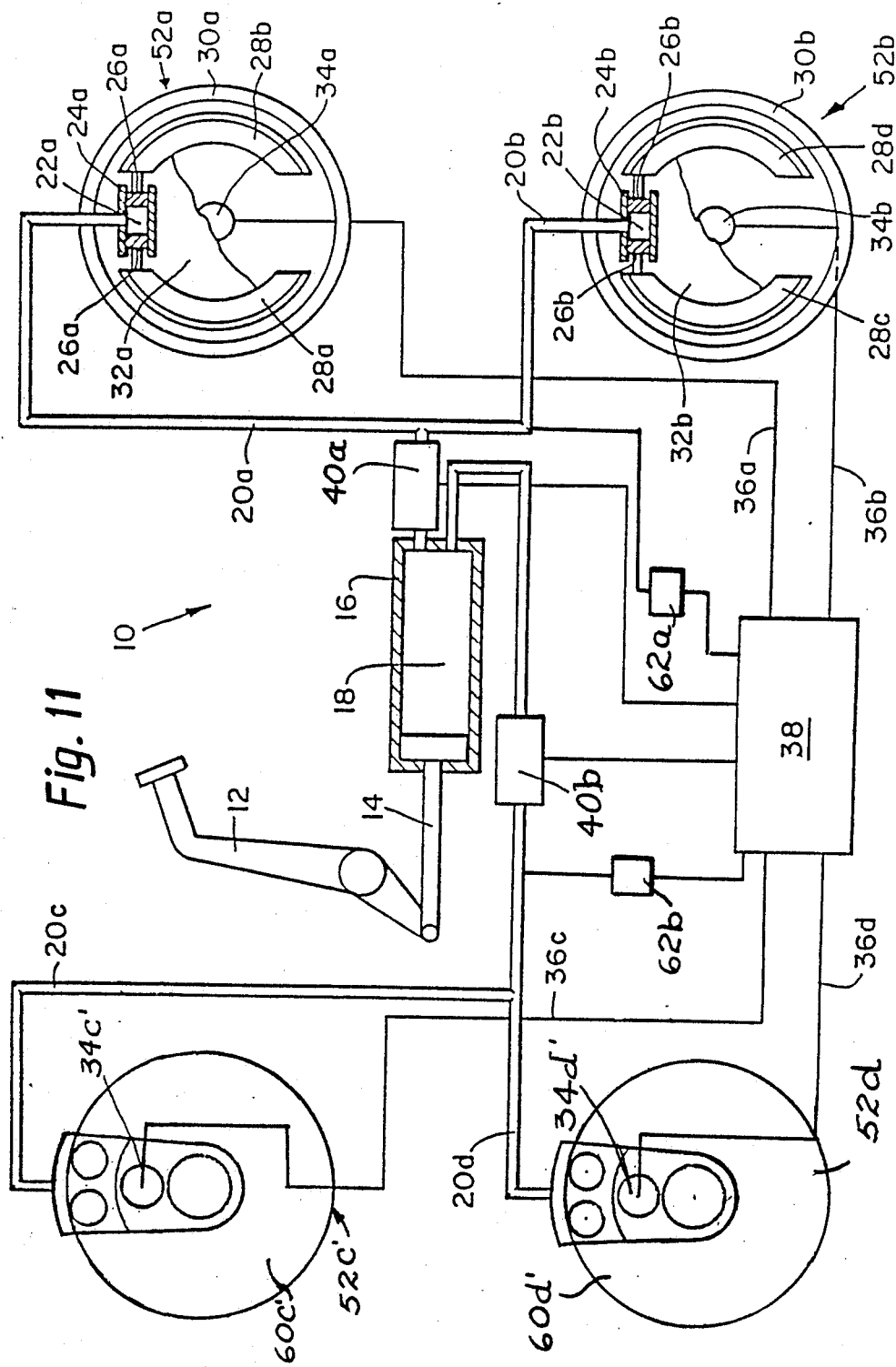

FIGS. 10 and 11 illustrate the application of the present invention to a front wheel disc brake system.

Figure 1:
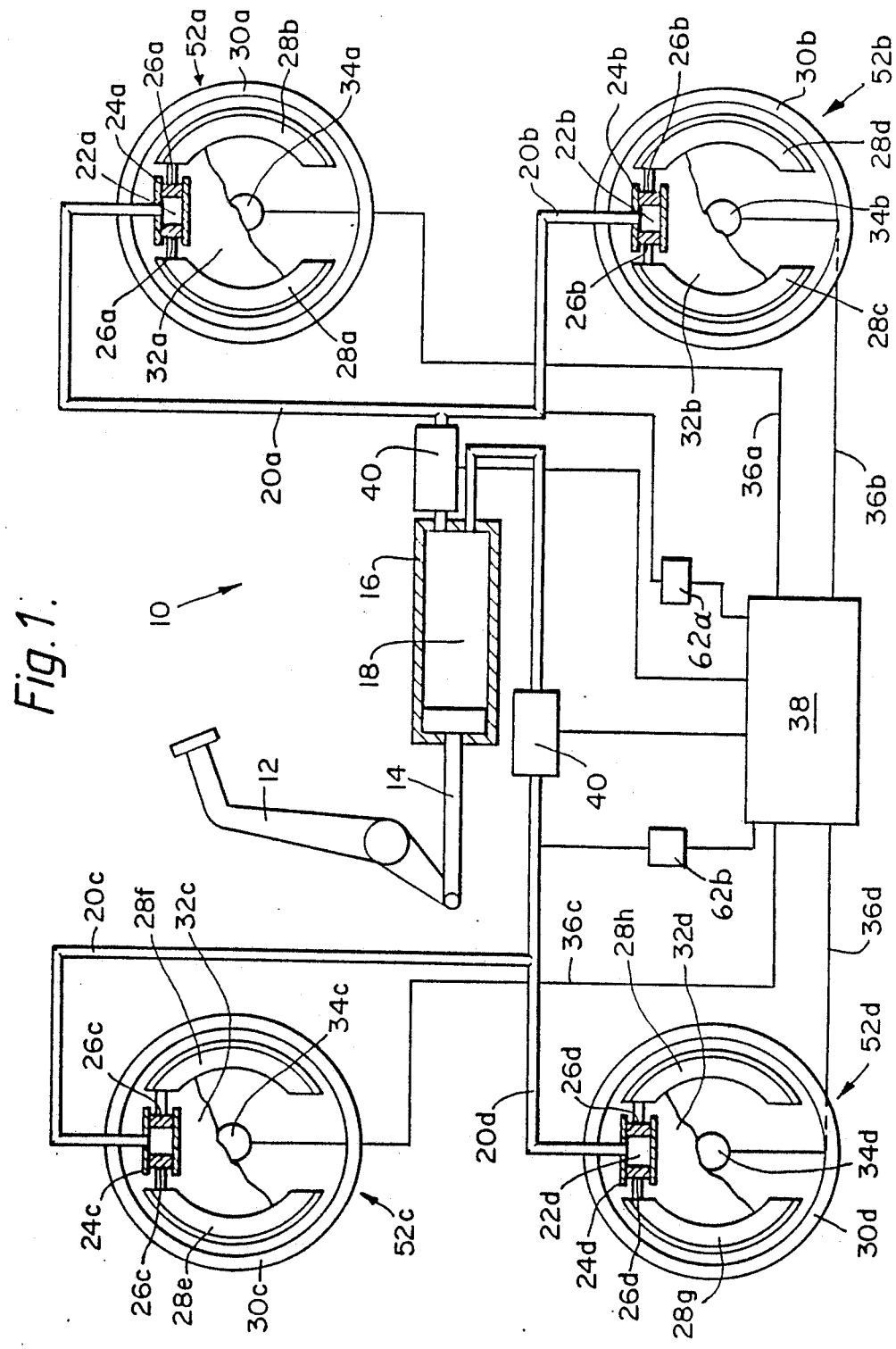
FIG. 1 is a diagrammatical representation of an antilock braking system for a vehicle according to the present invention.
Figure 2:
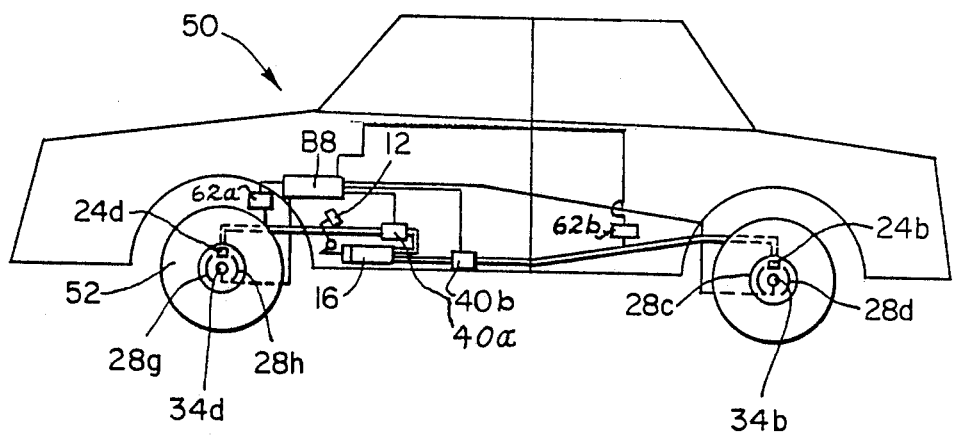
FIG. 2 is a diagrammatical representation of a vehicle with an antilock braking system according to the present invention.

An antilock braking system 10 for a vehicle is shown in FIG. 1 and comprises a brake pedal 12 connected to and arranged to move a first piston 14 axially in a first cylinder 16, to vary the volume of a first chamber 18 defined by the first cylinder and the first piston. The first cylinder 16, the master cylinder of the braking system, contains hydraulic fluid in the first chamber 18 and is connected via piping 20a, 20b, 20c and 20d to second chambers 22a, 22b, 22c and 22d respectively. Each second chamber 22a, 22b, 22c and 22d is defined by a second cylinder 24a, 24b, 24c and 24d respectively together with a pair of second pistons 26a, 26b, 26c and 26d respectively. The pistons of each pair of second pistons are positioned at opposite ends of the respective second cylinder and are arranged to move axially of the second cylinder.

Each of the second pistons abuts and is arranged to move a brake pad 28a, 28b, 28c, 28d, 28e, 28f, 28g and 28h respectively into frictional contact with a confronting surface 30a, 30b, 30c and 30d of a respective wheel. In this example the brake pads are brake shoes and the confronting surface of the wheel is the inner surface of the wheel drum.

Each of the second cylinders 24a, 24b, 24c and 24d is secured to a back plate 32a, 32b, 32c and 32d respectively which is a non rotating member of the wheel assembly 52a, 52b, 52c and 52d respectively. The brake shoes are also secured to the respective back plate but are free to move generally radially into and out of contact with the inner surface of the wheel drums.

In operation, when the brake pedal 12 is pressed the piston 14 moves axially into the master cylinder 16 and reduces the volume of first chamber 18. The hydraulic fluid contained in the first chamber 18 is then supplied under pressure to the second chambers 22a, 22b, 22c and 22d producing an increase in pressure which causes the second pistons 26a, 26b, 26c and 26d to move axially out of the second cylinders 24a, 24b, 24c and 24d respectively.

The movement of the second pistons axially outwards of the second cylinders causes the brake pads 28a, 28b, 28c, 28d, 28e, 28f, 28g and 28h to be moved generally radially into contact with the inner surface of the wheel drums 30a, 30b, 30c and 30d to give a braking ction on the wheels, as is well known in the art.

As discussed previously, under heavy braking action it is likely that the frictional contact between the brake pads and wheel drum will be sufficient to cause the wheel to skid on the brake pads prior to locking, and eventually to lock.

When friction occurs there is a conversion of energy into other forms of energy, particularly heat, as is well known. A portion of this energy is converted to stress waves, more commonly known as acoustic emission or secondary acoustic emission, which propogate at the speed of sound in the material and rapidly decay. These acoustic emission are produced over a broad range of frequencies. The acoustic emissions stress waves or vibrations propagate in all materials, solid or fluid.

A transducer 34a, 34b, 34c and 34d is acoustically coupled to a non rotating member of each wheel assembly, and this could be the brake pads, the back plate, the second cylinder or other member which would have acoustic emissions transmitted thereto from the brake pads of each wheel assembly, and in FIG. 1 is shown coupled to the backplate.

The transducers are arranged to provide an electrical output signal dependent upon the degree of acoustic emission activity in the non rotating member to which it is acoustically coupled and to send the output signal to a detector means 38. The acoustic emission level detected by the tranducers is related to the frictional energy losses during braking. Hence the acoustic emission level provides an indirect measure of the braking pressure or force applied by the brake pads on the wheel.

Figure 3:
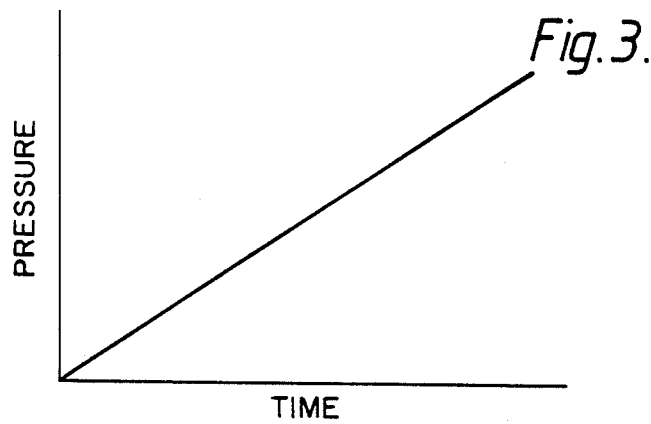
FIG. 3 is a graph of brake pressure against time.
Figure 4:
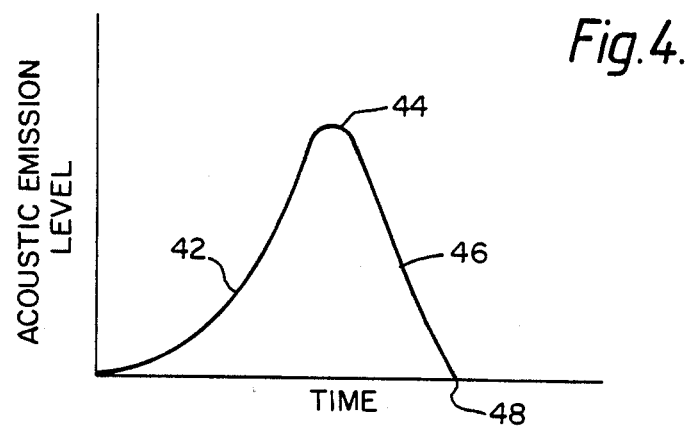
FIG. 4 is a graph of acoustic emission level against time.
Figure 5:
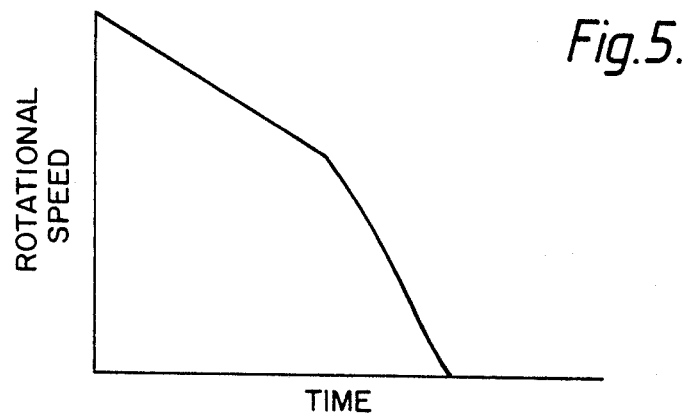
FIG. 5 is a graph of wheel rotational speed against time.

FIGS. 3, 4 and 5 show that as the brake pressure increases with time, the acoustic emission level increases over area 42 with time to a peak 44, and then decreases over area 46 to zero 48, or a minimal background level. The speed of rotation of the wheel reduces to zero at the same time as the acoustic emission level reaches zero, or a minimal background level.

In one arrangement the detector means is arranged to detect when the electrical output signal, which corresponds to the level of acoustic emission activity in the non rotating member, falls to zero, or a minimal background level that is when the wheel locks while in frictional contact with the brake pads.

The detector means is also arranged to detect when the electrical output signal has a relatively higher rate of reduction than a predetermined rate of reduction, that is when the wheel is skidding while in frictional contact with the brake pads.

The detector means sends a feed back signal to control means 40a, 40b which is arranged to release the brake pads from frictional contact with the confronting surface of the wheel momentarily before reapplying the brake pads into frictional contact with the confronting surface of the wheel, when the detector means detects that either the acoustic emission activity is zero, or a minimal background level or that the rate of reduction of the acoustic emission activity is higher than the predetermined rate of reduction.

FIG. 61a–6c show the effect of increasing the pressure applied by the brake pad on the wheel, the acoustic emission level increases initially, over area 52, and this corresponds to an increase in braking efficiency as the friction increases. The acoustic emission level then reaches a peak 54, this corresponds to the optimum braking efficiency, as the friction is at a maximum. Finally the acoustic emission level decreases, over area 56, to zero, because the braking efficiency reduces because the wheels lock and there is skidding. As can be seen from FIG. 6, increasing the brake pressure increases the acoustic emission level for non slip conditions, i.e., over area 52, and decreasing wheel speed decreases the acoustic emission level, i.e., compare FIG. 6a, 6b, and 6c.

In practice these plots would not be achieved since the speed does not remain constant as the brakes are applied. However, at any instant in time the speed can be assumed to be constant, and the basic curve would be applicable.

FIGS. 7a-7c show that the surface upon which the wheel runs does not effect the general shape of the acoustic emission level versus pressure graph, and similarly FIGS. 8a-8c show that the transducer sensitivity does not effect the general shape of the acoustic emission level versus pressure graph, although they do effect level of acoustic emission detected and the pressure at which the peak of acoustic emission level occurs.

It can be concluded that irrespective of actual speed, surface traction, grip or transducer sensitivity the position on the general curve of the graph of acoustic emission level versus pressure can be determined by analyzing the instantaneous slop of acoustic emission level versus pressure.

In the preferred arrangement the detector means measures the instantaneous change of the electrical output signal as a function of the pressure applied to the wheel by the at least one brake pad. The electrical output signal corresponds to the acoustic emission level in the non rotting member. That is the detector means measures the slop of the curve, i.e. the slope of the function, of the acoustic emission level versus pressure graph at any instant in time, and determines the position on the curve for that instant in time.

If the change of electrical input signal with pressure is positive, i.e. if the instant in time is on area 52 of the curve, the detector means sends a feedback signal to the control means which will allow the brake pressure to be increased by a predetermined amount if demanded by further depression of the brake pedal.

If the change of electrical output signal with pressure is negative, i.e. if the instant in time is on area 56 of the curve, the detector means sends a feed back signal to the control means which causes the brake pressure to be reduced by a predetermined amount, even if further depression of the brake pedal demands an increase in brake pressure.

If the change of electrical output signal with pressure is zero or approximately zero within a predefined range both positively and negatively, i.e. peak 54, the detector means sends a feedback signal to the control means which prevents the brake pressure increasing even if demanded by further depression of brake pedal.

A method of measuring the slope of acoustic emission level versus braking pressure curve would be to use a direct measure of an indirect measure of the brake pressure applied to the wheel by the brake pads. This brake pressure could be measured using any suitable means, for example, a pressure sensor 62a, 62b could be used to directly measure the hydraulic pressure of the hydraulic fluid applied to the wheel brake or a strain gauge could be connected to the brake pedal to measure the pressure or force applied by the driver of the vehicle on the brake pedal, thus giving an indirect measurement of the braking force applied by the brake pads on the wheel during unmodulated braking, In practice, to measure the slope of acoustic emission level versus pressure curve, i.e. electrical output signal as a function of the pressure applied to the wheel by the brake pad, at any instant it will be necessary to carry out the measurement over a short period of time rather than instantaneously. One method of achieving this would be to modulate the brake pressure, and the rate or frequency of modulation would have to be sufficiently high so that the speed of the vehicle could not change appreciably during the modulation period, and the slope of the acoustic emission level versus pressure curve could be calculated during each modulation cycle.

FIG. 9 shows a graph of acoustic emission level versus pressure for a pressure modulated system. The modulation of the pressure causes the pressure to vary sinusoidally about a mean pressure.

The pressure modulation could be produced by having a special master cylinder, first cylinder, which produces these periodic changes in brake pressure, or it may be possible to have a slave cylinder which produces the periodic changes in brake pressure. The frequency of modulation will be chosen so as not to produce vibrations, i.e. not a natural frequency of oscillation of the system.

The slope of the emission level versus pressure curve is measured for each pressure modulation cycle, and a feedback signal is sent to the control means to control the brake pressure. The brake pressure may be reduced, or increased by a predetermined amount at each pressure modulation cycle so that the braking pressure approaches that required for optimum braking efficiency, and the predetermined amount will be chosen to minimize the number of modulation cycles required to obtain optimum braking pressure. The predetermined amount may be a fixed pressure change, or it may be a variable pressure change which may be related to the change of the electrical output signal with pressure, i.e. if the slope is steep and negative the reduction is relatively small, and if the slop is shallow and negative the reduction is relatively large, or it may be related to other vehicle parameters.

The use of modulation of the brake pressure, and calculation of the slope of the acoustic emission level versus pressure curve over each modulation cycle may use a measure of the brake pressure, but the use of a measure of the brake pressure by any suitable means may be obviated in this arrangement as sufficient information may be gained from the knowledge of the timing relative to the pressure modulation cycle.

The invention therefore provides a braking system which dynamically produces a feedback signal to control the brake pressure so as to allow the optimum brake pressure to be applied to the wheel, and the feed back signal is used to dynamically sustain the optimum brake pressure despite variations in road grip conditions.

The transducers on the wheel assemblies are arranged so that the transducers on wheel assemblies on a common axle have matched sensitivities. This would allow the comparision of transducer electrical output signals, and monitoring of these electrical output signals over longer time periods than one pressure modulation period would enable the recognition of brake squeal, assymetric braking and degradation of a transducers sensitivity.

The preferred arrangement does not require a measurement of rotational speed for each wheel, nor an indication of vehicle deceleration as is required for conventional antilock braking systems.

The preferred braking systems according to the invention may be easily installed, only one transducer is required per wheel assembly, and a special master cylinder to produce the pressure modulation, together with a computer, mini computer or micro computer to analyze the electrical output signals and brake pressure, and a control system to control the brake pressure.

The preferred arrangement will be smooth in operation because the modulation is sinusoidal about a mean pressure rather than on/off as in the conventional system. This would give better passenger comfort and reduce stresses on the mechanical parts of the braking system.

This preferred braking system may be applicable to motorcycles, whose front forks are not rigid enough to use conventional antilock braking system, because of the smooth operation.

This system prevents the wheels locking or skidding under braking action.

Preferably the transducer is coupled to the back plate or the second cylinder as the transducer would have to be or the second cylinder as the transducer would have to be disconnected each time the brake pads are changed.

This system is also applicable to disc brakes as, illustrated in FIGS. 10 and 11 the transducer would again be mounted on a non rotating member, this could be one of the cylinders which have pistons to move brake pads against the disc surfaces.

The disc brakes could be of the type which are mounted on the wheel, or the type which are mounted on shafts driving the wheels.

The invention preferably detects very high frequency stress waves in non rotating members, but the invention is applicable to all acoustic emissions, i.e., stress waves and vibrations airborne or structure borne using frequencies from several Hz to the order of 50 MHz. It is possible to use audible sound waves and these could be detected using microphones.

I claim:

1. An antilock braking system for a vehicle comprising
   a wheel having a confronting surface, at least one brake pad arranged to move into frictional contact with the confronting surface of the wheel,
   a transducer acoustically coupled to the at least one brake pad, the transducer providing an electrical output signal dependent upon the degree of acoustic emission activity produced by frictional contact between the brake pad and the confronting surface of the wheel during a braking operation,
   detector means for analyzing the electrical output signal of said transducer which corresponds to the level of acoustic emission activity,
   control means which controls the pressure applied to wheel by the at least one brake pad,
   wherein the detector means analyzes the electrical output signal to determine if there is locking of the wheel, the detector means sending a feedback signal to the control means when locking of the wheel is detected so as to at least reduce the pressure applied to the wheel in one mode of operation to prevent locking of the wheel.

2. An antilock braking system as claimed in claim 1 in which the detector means is adapted to detect when the electrical output signal which corresponds to the level of acoustic emission activity falls to substantially zero when the at least one brake pad is in frictional contact with the confronting surface of the wheel, the detector means being adapted to send a feedback signal to the control means which momentarily releases the force exerted by the at least one brake pad on the confronting surface of the wheel to prevent locking of the wheel.

3. An antilock braking system as claimed in claim 1 wherein said at least one brake pad has associated therewith means for measuring the pressure applied to the wheel by said at least one brake pad and in which the detector means measures the instantaneous change of the electrical output signal as a function of the pressure applied to the wheel by the at least one brake pad, the detector means being adapted to send a feedback signal to the control means which allows the pressure applied to the wheel to be increased by a predetermined amount when the said change of the electrical output signal as a function of pressure applied to the wheel is positive, reduces the pressure applied to the wheel by a predetermined amount when the said change of the electrical output signal as a function of pressure applied to the wheel is negative or maintains the pressure applied to the wheel when the said change of the electrical output signal as a function of pressure applied to the wheel is substantially zero so that the pressure applied to the wheel by the at least one brake pad corresponds substantially to that required for maximum braking efficiency.

4. An antilock braking system as claimed in claim 3 in which the pressure applied to the wheel by the at least one brake pad is modulated and the instantaneous change of the electrical output signal as a function of the pressure applied to the wheel by the at least one brake pad is measured over one period of modulation.

5. An anti-skid braking system for a vehicle comprising
   a wheel having a confronting surface, at least one brake pad arranged to move into frictional contact with the confronting surface of the wheel,
   a transducer acoustically coupled to the at least one brake pad, the transducer providing an electrical output signal dependent upon the degree of acoustic emission activity produced by frictional contact between the brake pad and the confronting surface of the wheel during a braking operation,
   detector means for analyzing the electrical output signal of said transducer which corresponds to the level of acoustic emission activity,
   control means which controls the pressure applied to the wheel by the at least one brake pad,
   wherein the detector means analyzes the electrical output signal to determine if there is skidding of the wheel, the detector means sending a feedbacks signal to the control means when skidding of the wheel is detected so as to at least reduce the pressure applied to the wheel in one mode of operation to prevent skidding of the wheel.

6. An antilock braking system as claimd in claim 5 in which the detector means is adapted to detect when the rate of reduction of the electrical output signal is greater than a predetermined rate of reduction when the at least one brake pad is in frictional contact with the confronting surface of the wheel, the detector means being adapted to send a feedback signal to the control means which momentarily releases the force exerted by the at least one brake pad on the confronting surface of the wheel to prevent skidding of the wheel.

7. An antilock braking system as claimed in either of claims 1 or 5 in which a brake pedal is connected to and is arranged to move a first piston axially in a first chamber defined by a first cylinder, the first chamber being arranged to supply hydraulic fluid through piping to at least one second chamber defined by a second cylinder, the second chamber having at least one second piston arranged to move axially of the second cylinder, the at least one second piston abutting and being arranged to move the at least one brake pad into frictional contact with the confronting surface of the wheel when the brake pedal moves the first piston into the first chamber.

8. An antilock braking system as claimed in claim 7 in which the pressure applied to the wheel ismodulated by modulation of the pressure of the hydraulic fluid.

9. An antilock braking system as claimed in claim 8 in which the first cylinder produces periodic changes in pressure.

10. An antilock braking system as claimed in claim 7 in which the brake pad is a brake shoe, and the confronting surface of the wheel is an inner surface of the wheel drum.

11. An anti lock braking system as claimed in claim 10 in which said brake shoe and said second cylinder are non rotating members and said brake shoe includes a back plate which is also a non rotating member and said transducers are acoustically coupled to one of said non rotating members.

12. An antilock braking system as claimed in claim 7 in which the confronting surface of the wheel is a surface of a wheel disc.

* * * * *